United States Patent
Medrano et al.

(10) Patent No.: US 7,558,593 B2
(45) Date of Patent: Jul. 7, 2009

(54) OUTER LOOP POWER CONTROL METHOD AND APPARATUS FOR WIRELESS COMMUNICATION SYSTEMS

(75) Inventors: Alvaro Lopez Medrano, Madrid (ES); Alfonso Campo Camacho, Madrid (ES); Jose Maria Hernando Rabanos, Madrid (ES)

(73) Assignee: T.O.P. Optimized Technologies, S.L., Madrid (ES)

( * ) Notice: Subject to any disclaimer, the term of this patent is extended or adjusted under 35 U.S.C. 154(b) by 532 days.

(21) Appl. No.: 11/485,774

(22) Filed: Jul. 13, 2006

(65) Prior Publication Data

US 2007/0218933 A1 Sep. 20, 2007

(30) Foreign Application Priority Data

Mar. 16, 2006 (ES) ................. 200600683

(51) Int. Cl.
*H04Q 7/20* (2006.01)
(52) U.S. Cl. .................. 455/522; 455/69; 455/68; 455/127.1; 455/500; 455/517; 370/335; 370/328; 370/329; 370/342; 370/343
(58) Field of Classification Search .......... 455/522, 455/69, 68, 127.1, 400, 517, 67.11, 63.1, 455/67.13, 422.1, 403, 414.1, 412.2, 414.3, 455/550.1, 500; 370/335, 328, 329, 342, 370/341, 343
See application file for complete search history.

(56) References Cited

U.S. PATENT DOCUMENTS

2004/0229639 A1* 11/2004 Meyers et al. ............... 455/522
2005/0099957 A1* 5/2005 Soldani et al. .............. 370/252
2005/0176456 A1 8/2005 Chen et al.
2006/0079264 A1* 4/2006 Gu et al. ..................... 455/522

FOREIGN PATENT DOCUMENTS

ES 2 249 192 3/2006

OTHER PUBLICATIONS

Sampath A, Kumar PS & Holtzman JM (1997), "On setting reverse link target SIR in a CDMA system", Proceedings of the IEEE Vehicular Technology Conference, Phoenix, Arizona, pp. 929-933.

* cited by examiner

*Primary Examiner*—Keith T Ferguson
(74) *Attorney, Agent, or Firm*—Katten Muchin Rosenman LLP

(57) ABSTRACT

An adjustment of the target signal to interference ratio ($SIR_{target}$) at the start of each transmission (N) uses an Outage-Based OLPC method, which establishes the ratio ($SIR_{target}$) as the sum of a first component ($SIR_{outage\text{-}tgt}$) that adjusts quickly to the conditions of the communications channel and a second component ($SIR_{BLER\text{-}tgt}$) that is adjustable according to a target block error rate ($BLER_{target}$) The stored values of the two components ($SIR_{outage\text{-}tgt}$, $SIR_{BLER\text{-}tgt}$) in at least one prior transmission (N−1) are used obtain convergence of the target ratio ($SIR_{target}$) by setting the initial value in the transmission (N) for the first component ($SIR_{outage\text{-}tgt}$) equal to a value higher than the average values for the first component ($SIR_{outage\text{-}tgt}$) and setting the initial value in said transmission (N) for the second component ($SIR_{BLER\text{-}tgt}$) and setting the initial value in said transmission (N) for the second component ($SIR_{BLER\text{-}tgt}$) equal to the average of the values of the second component ($SIR_{BLER\text{-}tgt}$).

13 Claims, 4 Drawing Sheets

100

200

OUTER LOOP POWER CONTROL METHOD AND APPARATUS FOR WIRELESS COMMUNICATION SYSTEMS

OBJECT OF THE INVENTION

The present invention is applicable in the field of telecommunications, particularly in the industry dedicated to manufacturing base stations and mobile units in cellular infrastructures for wireless communication systems.

More specifically, the invention described herein, within communications, relates to a method and apparatus for outer loop power control system in a mobile telephony cellular network, conceived for third generation (3G) technologies based on one or more Code Division Multiple Access (CDMA) standard protocols.

An object of the invention is to allow a fast initial convergence of the target signal-interference ratio in the outer loop and to optimise the capacity of the wireless communications system.

It is also the object of the invention to provide an apparatus adapted for incorporation in the radio network controller or in a mobile unit, to allow establishing at the start of each transmission the target signal-interference ratio of the outer loop ideal for controlling power in the initial convergence.

BACKGROUND OF THE INVENTION

In January 1998 the European Telecommunications Standards Institute (ETSI) selected the basic technology for the Universal Mobile Telecommunications System (UMTS) (see ETSI, "The ETSI UMTS Terrestrial Radio Access (UTRA) ITU-R RTT Candidate Submission", June 1998). The main radio interface proposed was the WCDMA Wideband Code Division Multiple Access protocol, the properties of which allow satisfying the third-generation (3G) mobile telephony requirements in full. Due to the high data transmission rate and the increasingly demanding Quality of Service (QoS) requirements, it became necessary to develop new planning strategies. Among these, the one that is possibly the object of a larger number of studies is the power control system, specifically the procedure used to implement the outer loop of said system.

A general overview is given below of said power control system, as the functionality of the outer loop, for which this invention proposes a method, results from other system components.

Power control systems are needed in WCMDA-based cellular networks because this technology is limited by interference, as all users share the same frequency spectrum and their codes are not fully orthogonal (see Holma & Toskala: "WCDMA for UMTS, Radio Access for Third Generation Mobile Communications", John Wiley & Sons).

The ultimate purpose of the power control system in WCDMA is to attain the required Quality of Service for a specific downlink from the base station to the mobile unit or terminal unit, or an uplink from the mobile unit to the base station, with a minimal transmitted power (the latter aspect is what the invention is centred upon).

The main objectives of the power control system in WCDMA networks are:

Cancelling the near-far effect: if all mobile stations transmit at the same power, without considering the distance or fading to the base station, the mobile units nearest the station will create significant interference for more distant terminals.

Protecting against deep fading.

Minimising interference in the network, with the resulting improvement in capacity.

Greater duration of mobile station batteries.

A WCMDA power control system is jointly implemented by three differentiated procedures:

Open loop: during the initial random access process of a connection, the base/mobile station estimates the power loss in the uplink/downlink and adjusts the transmission power accordingly.

Closed or internal loop, also known as fast power control (1500 Hz). Comprises the following three steps:

1) The corresponding receiver (base station or mobile unit) compares the desired signal—received interference ratio ($SIR_{rec}$) with the target desired signal—interference ratio ($SIR_{target}$), which depends on the quality of service required for this specific link and is determined by the open loop procedure explained further below.

2) The same receiver terminal sends power control bits indicating the transmission power must be increased (if $SIR_{rec} < SIR_{target}$) or reduced (if $SIR_{rec} > SIR_{target}$) by a certain amount (normally 1 dB).

3) The transmitter unit (base station or mobile unit) increases or reduces its power by the previously determined amount.

Outer Loop Power Control (OLPC). This is a much slower method than closed loop (10-100 Hz) and determines the target desired signal-interference ratio ($SIR_{target}$) that will maintain a predetermined quality goal. One criterion or measure of link quality is the Frame Error Rate (FER) or, equivalently, the Block Error Rate (BLER), which depends on the desired signal to interference ratio (SIR). As the inner loop allows maintaining the desired received signal-interference ratio ($SIR_{rec}$) near the target ratio ($SIR_{target}$), the block error rate (BLER) is ultimately determined by this target value. In this way, to attain a certain quality of service in a given fade environment, $SIR_{target}$ must be adjusted to the appropriate value for that environment.

At the start of each transmission, whether voice or data, during a communication or call, the aforementioned outer loop power control (OLPC) usually sets $SIR_{target}$ to a very high value, in order to ensure a secure communication (see the patent by Tao Chen and Stein Lundby, US2005/0176456 of 17 Mar. 2005 entitled "Systems and methods for performing Outer Loop Power control in wireless communication systems"), then waiting for the aforementioned OLPC algorithm to reduce the value of $SIR_{target}$ to the suitable value for fulfilling the BLER corresponding to the service demanded. This process of reducing the $SIR_{target}$ at the start of each transmission, at the end of which the $SIR_{target}$ value approaches an ideal value, or the required signal-interference ratio ($SIR_{req}$), is known as the initial convergence.

The most widely used design for outer loop power control (OLPC) is based on target block error rate ($BLER_{target}$) and known as BLER-Based OLPC. It measures this rate and changes $SIR_{target}$ accordingly, depending on whether $BLER_{target}$ is above or below the desired threshold (see Sampath A, Kumar P S & Holtzman J M (1997), "On setting reverse link target SIR in a CDMA system", *Proceedings of the IEEE Vehicular Technology Conference*, Phoenix, Ariz., p 929-933). The problem is that due to the characteristics of the OLPC algorithm commonly used (see Holma H., Toskala A., "WCDMA for UMTS", Wiley, 2002) the process of diminishing $SIR_{target}$ is very slow. This slow convergence is due to the fact that the down step size used by the algorithm, measured in dBs is on the order of the target frame error rate ($FER_{target}$) (typical values are $10^{-2}$ for voice service and $10^{-3}$ for video calls), i.e. very small. Therefore, several tens of seconds are needed for each reduction by one dB.

Therefore, the aforementioned process of initial convergence in WCDMA is very slow, meaning that the $SIR_{target}$ fixed by the BLER-Based OLPC algorithm is greater than needed for a long time, with the resulting increase in interference and therefore loss of system capacity.

The problem is more marked in cases of discontinuous transmission services, in which the communication channel is used intermittently so that the initial convergence process takes place many times, as the transmission is constantly being ended and started, so that there are periods of silence between one transmission and the next within one voice or data call. Because the aforementioned process is very slow, as described above, it can be inferred that the known outer loop power control method, BLER-based OLPC, is inadequate for this type of service (see again the patent by Tao Chen & Stein Lundby number US2005/0176456 of 17 Mar. 2005 with title: "Systems and methods for performing Outer Loop Power control in wireless communication systems").

Much research has been conducted on solving the slow convergence of the usual power control method which, as explained, takes place in BLER-Based OLPC. In this sense, it is worth mentioning Spanish Patent Application ES 2249192, filed by the applicant of the present invention. In the former invention, as described in ES 2249192, an outer loop power control method is proposed known as "Outage-Based OLPC", in which the $SIR_{target}$ is calculated as the sum of two components, $SIR_{target}=SIR_{outage-tgt}+SIR_{BLER-tgt}$, by a dynamic adjustment function that establishes a correspondence between the quality criterion based on the target block error rate ($BLER_{target}$) and an additional quality criterion based on outage probabilities. The first component ($SIR_{outage-tgt}$) adapts to the changing propagation conditions of the channel, so that it must be able to vary quickly. However, the second component ($SIR_{BLER-tgt}$) is in charge of guaranteeing the target block error rate ($BLER_{target}$) and therefore must maintain the characteristic step process of the known method, BLER-based OLPC (see again Sampath A, Kumar P S & Holtzman J M (1997), "On setting reverse link target SIR in a CDMA system", *Proc. IEEE Vehicular Technology Conference*, Phoenix, Ariz., p 929-933).

Precisely for this reason, the last component ($SIR_{BLER-tgt}$) of the $SIR_{target}$ has slow response characteristics, due to the BLER-based OLPC, as it includes the effects on the BLER that are not related to propagation conditions but instead to other parameters that depend more on the mobile terminal than the communications channel.

DESCRIPTION OF THE INVENTION

The present invention allows solving the problems described above, among others, in each and every aspect described in the prior art section, constituting a power control method and apparatus for mobile communications system based on the outer loop power control system "Outage-Based OLPC" disclosed in the aforementioned Spanish Patent Application 2249192, instead of the conventionally employed "BLER-based OLPC".

The method object of the invention, and therefore the apparatus that operates according to the method of the invention, determines the value of the target signal to interference ratio ($SIR_{target}$) at the start of a communication and each time the transmission is re-established in the communication, this is, whenever an initial convergence process is started for said $SIR_{target}$. They are also applicable to discontinuous transmission services in which the channel is used intermittently, so that the initial convergence process takes place very often. In short, the method proposed herein as one of the aspects of the invention acts both when a call is established and when a transmission is recovered after a period of silence in a conventional voice communication or burst data communication.

More specifically, at the start of each transmission the method of the invention, using values of the two components of $SIR_{target}$ corresponding to the values determined by the "Outage-Based OLPC" method during the last transmissions, in a single communication or several different communications performed immediately prior for one single type of service, establishes the following:

the first component ($SIR_{outage-tgt}$) is reset to a value clearly higher than the average of the last values for said first component ($SIR_{outage-tgt}$) during the previous or earlier transmissions; and the second component ($SIR_{BLER-tgt}$) is reset to a value equal to the average of the last values of said second component ($SIR_{BLER-tgt}$) during the previous or earlier transmissions.

For example, according to the method proposed and in a preferred embodiment, in which values of each component in previous transmissions can be stored, the target desired signal to interference ratio ($SIR_{target}$) is established at the start of a transmission as the sum of:

a first component ($SIR_{outage-tgt}$) set at the 90th percentile of the values of said first component ($SIR_{outage-tgt}$) in the last transmissions of the same communication and/or the immediately prior communications of the same service; and a second component ($SIR_{BLER-tgt}$) equal to its average value in the previous transmission of the communication or, if there is no previous transmission in the communication, equal to the average value in the last transmission of the previous communication of the same type of service.

The number of previous transmissions considered to determine the set of final values that will be stored for each component, prior to initiating each new transmission, depends on the embodiment. Normally, the values of the previous ten transmissions can be used, preferably considering only the immediately previous transmission as the values of the respective components in transmissions close in time are generally very similar.

The first component ($SIR_{outage-tgt}$) is always set at a considerably high initial value, above the average of the end values considered (stored), such as in a percentile range from 80 to 95.

As the second of the two components ($SIR_{BLER-tgt}$) of the target signal to interference ratio ($SIR_{target}$) is that with the slowest convergence, as explained in Spanish Patent application ES 2249192, determining the value of this second component ($SIR_{BLER-tgt}$) by the method proposed herein at the start of the transmission allows a fast initial convergence process. This is because said second component ($SIR_{BLER-tgt}$) includes the effects on the block error rate (BLER) not related to the fast variation of the signal, so that the value of said second component ($SIR_{BLER-tgt}$) does not depend on the propagation conditions and, therefore, the last value it had in the previous call for the same type of service is ideal for beginning the next call. The method is even further refined by setting as the initial value of said component an average of its values in the immediately previous calls, such as the last ten calls, made for the same type of service.

As regards the other component of the target signal to interference ratio ($SIR_{target}$), which is not so slow in the initial convergence, a high value is set considering the values of previous calls, thereby ensuring on one hand that the value of $SIR_{target}$ at the start of the call is sufficiently high to ensure the quality of service, while on the other not hampering a suitable initial convergence as it is known that the first component ($SIR_{outage-tgt}$), according to Spanish Patent application ES 2249192, has a fast convergence rate.

In this way the invention manages to reduce the initial convergence time of $SIR_{target}$, while still guaranteeing a secure communication.

The consequence of a short initial convergence time in WCDMA, as it is a technology limited by interference, is an increased system capacity.

Another aspect of the invention relates to an outer loop power control apparatus for wireless communication systems, comprising at least one programmable electronic device that operates according to the method described above. The programmable electronic device may be a general purpose processor, a digital signal processor (DSP), an application-specific integrated circuit (ASIC) and a programmable card (FPGA) or any combination thereof. The general purpose processor is preferably a microprocessor or other possible alternatives: a conventional processor, a microcontroller or any state machine in general. Moreover, the programmable electronic device can comprise a combination of multiple microprocessors, one microprocessor and one or more DSP devices, or any other configuration in which the execution of the various phases is distributed in series or in parallel, comprised within the method described above.

Optionally, the outer loop power control apparatus for wireless communication systems proposed can comprise a radio-frequency receiver able to receive the data signal from a base or mobile station. It is also possible to incorporate in said device a radio-frequency transmitter able to send the power control information to the corresponding mobile or base station. Thus, this outer loop power control apparatus can be incorporated in a wireless communications network controller, or in the user or mobile terminal of the wireless communications system.

Some final aspects of the invention include a Radio Network Controller (RNC), (which contains the call processing logic) and a mobile station (remote user or terminal, UE). Each device comprises the outer loop power control apparatus for wireless communication systems described.

The invention is applicable to any wireless communications system supporting one or more standards of the CDMA protocol, such as WCDMA, IS-95, CDMA2000, specification HDR, etc.

DESCRIPTION OF THE DRAWINGS

To complete the description being made and in order to aid a better understanding of the characteristics of the invention, according to a preferred embodiment thereof, the present description is accompanied by a set of drawings forming an integral part of the description where, for purposes of illustration and in a non-limiting sense the following is shown.

PREFERRED EMBODIMENT OF THE INVENTION

Figure 1:
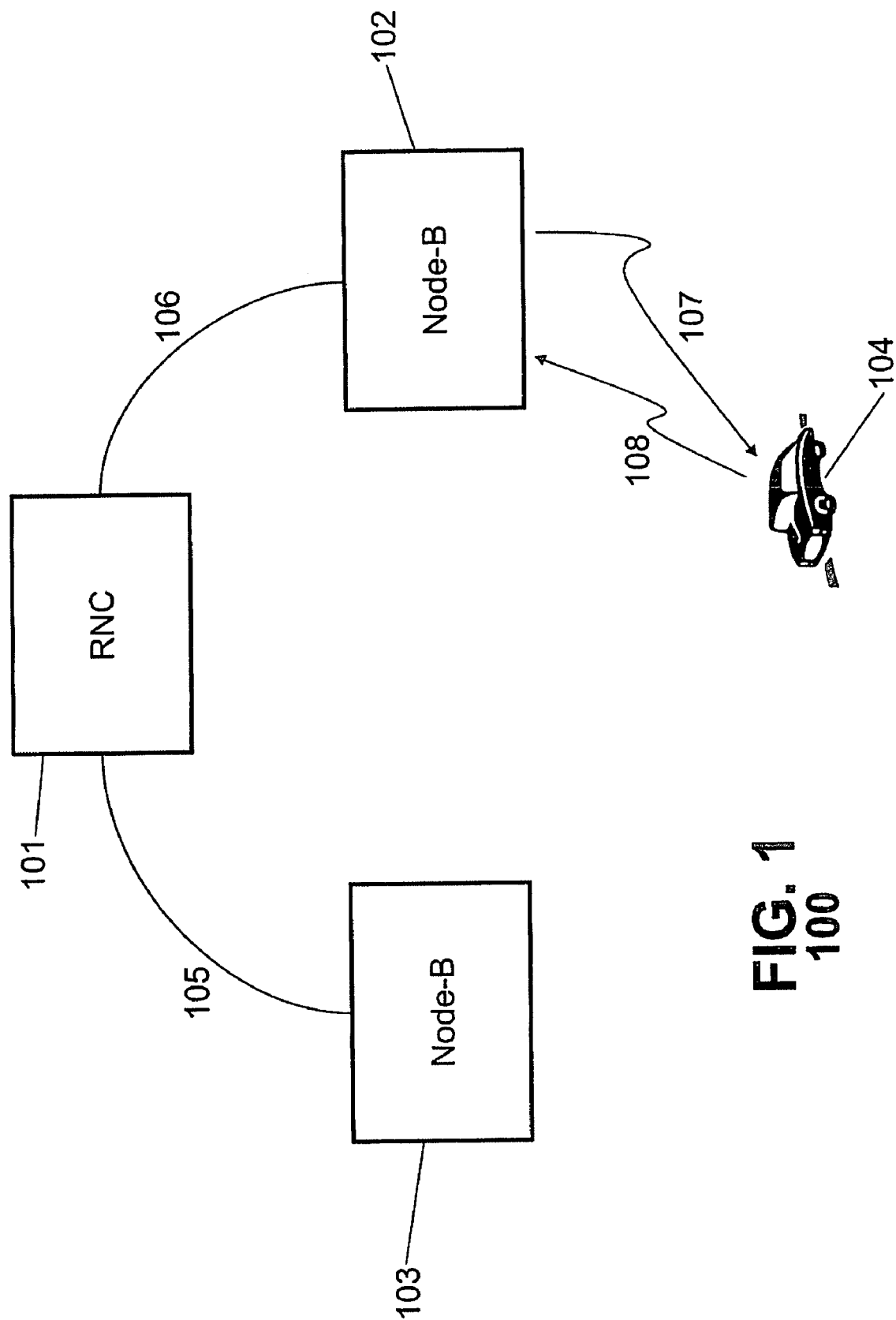
FIG. 1 shows part of a mobile communications system as known in the state of the art, including the components of a cellular infrastructure, user mobile terminal, base station and remote network controller related to the object of the invention.

FIG. 1 represents one part (100) of a WCDMA mobile communications system. Aside from the invention, the elements shown in the figure are well known and not described in detail. One element of interest is the user terminal unit or mobile station (104) which is represented by the vehicle icon. The WCDMA mobile communications system comprises several base stations (102, 103) or B-nodes in the UMTS network, containing processors, memories, interface cards and embedded software programs. This part of the system includes a radio network controller or RNC (101) which, among other functions, enables call processing. The two base stations (102, 103) and the mobile station (104) are representative of end points of the wireless interface. Each base station (102, 103) is associated to an RNC (101) through land lines (105, 106). In what follows, it is assumed that the mobile station (104) is in communication with the base station (102) by the downlink data signal (107) and the uplink data signal (108).

Figure 2:
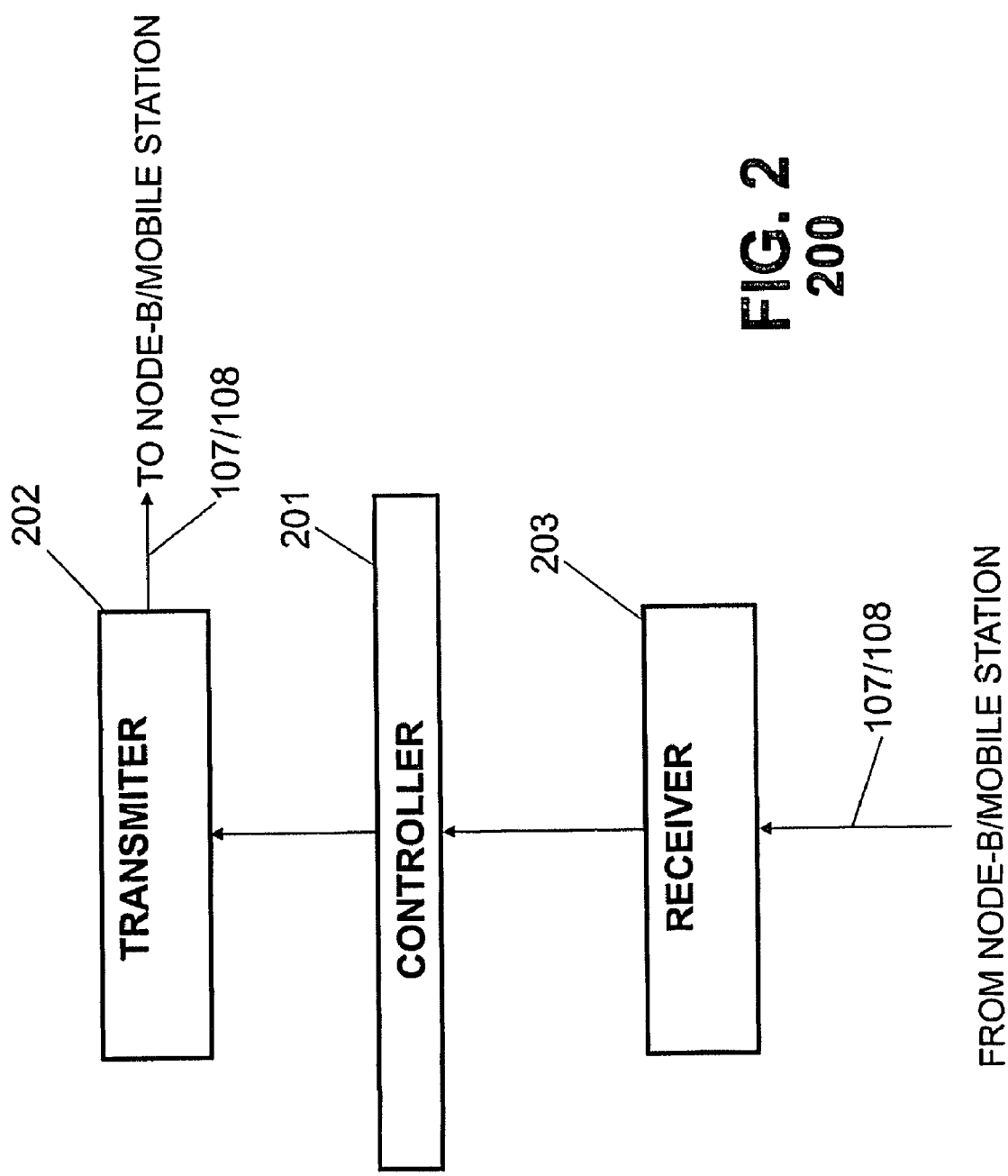
FIG. 2 shows a block diagram according to the state of the art of the part of a base station or mobile related to the invention.

FIG. 2 represents the part (200) of the two stations, the base station (102) and the mobile station (104), which includes the principles on which the invention is based. The known aspects of the elements shown in said figure are not discussed, as a radio-frequency transmitter (202) and receiver (203) are described in detail in the state of the art. Both the base station (102) and the mobile station (104) contain a controller (201), a transmitter (202) and a receiver (203). Thus, in the case of the base station (102) the signal received corresponds to the uplink (108) and in the case of the mobile station (104) the signal received is the uplink signal (107); both arrive at the controller (201) through the receiver (203). The power control apparatus object of the invention is incorporated in the controller (201) and sends a command by the transmitter (202) instructing the current receiver station to increase or reduce its power, depending on the result of the outer loop power control method described below, the purpose of which is to determine the target signal to interference ratio ($SIR_{target}$) used as a threshold in the closed loop for power control.

Figure 3:
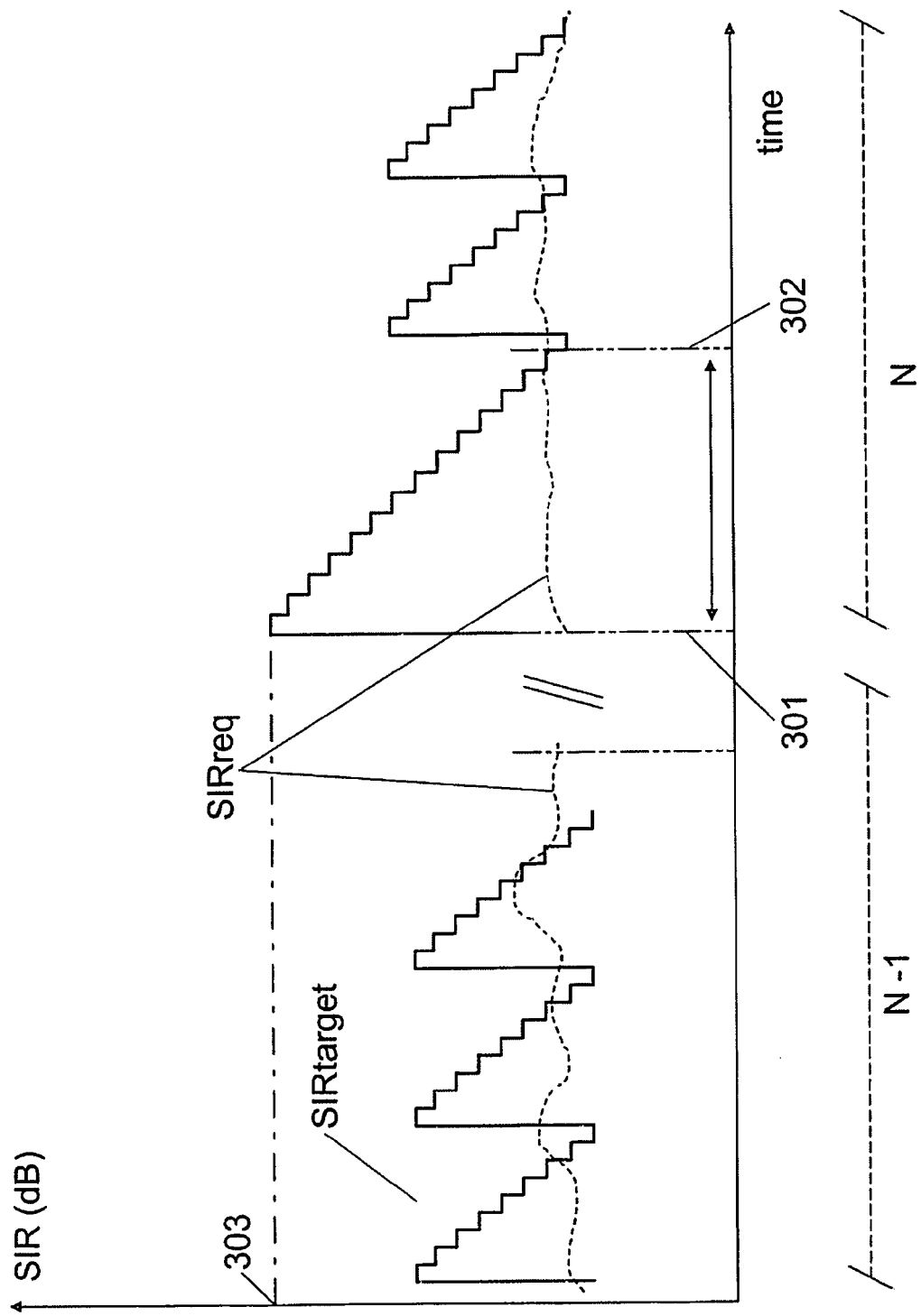
FIG. 3 shows a graph of the initial convergence of the target signal to interference ratio ($SIR_{target}$) in time, measuring $SIR_{target}$ in decibels, when the BLER-based OLPC system known in the state of the art is used.

FIG. 3 represents the usual initial convergence process, as known in the state of the art, by means of BLER-based OLPC. As specified, at the start time (301) of a transmission (N) the value of $SIR_{target}$ is set to a high value (303) to ensure a reliable communication. Later, starting from said high value (303), the outer loop power control begins to reduce the value of $SIR_{target}$ until it is adjusted to the appropriate value, according to the BLER-based OLPC method. However, due to the characteristics of the step algorithm on which is based said BLER-based OLPC, this reduction process is slow as the down step size in said algorithm is very small, as seen in Sampath A, Kumar P S & Holtzman J M (1997), "On setting reverse link target SIR in a CDMA system", *Proc. IEEE Vehicular Technology Conference*, Phoenix, Ariz., p 929-933. Therefore, the end (302) of the initial convergence process takes a long time with BLER-based OLPC.

Figure 4:
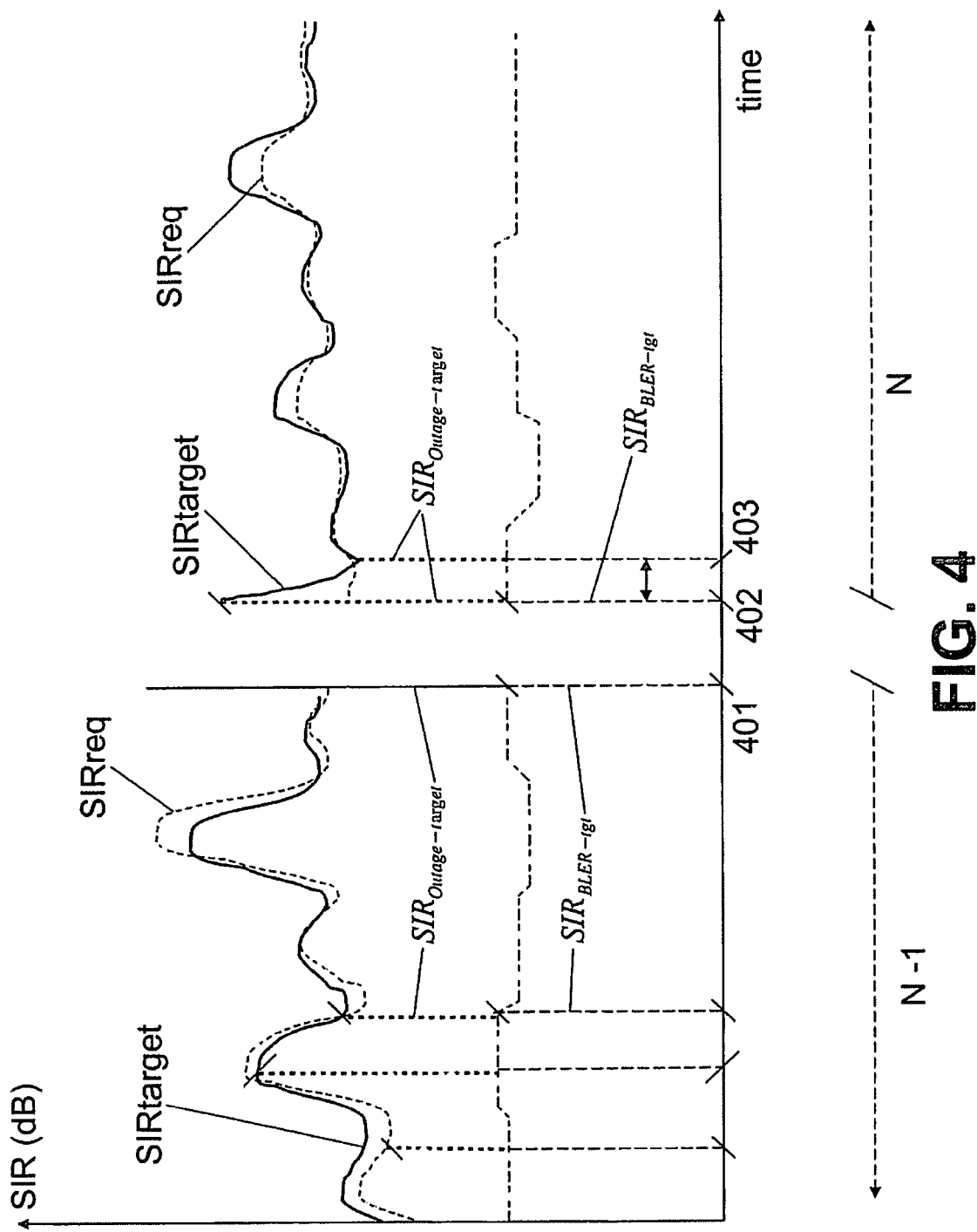
FIG. 4 shows a graph of the initial convergence of the target signal to interference ratio ($SIR_{target}$) when using the Outage-based OLPC and completed with the method of the invention, according to which and in a preferred embodiment, the value of $SIR_{target}$ is described as the sum of two components, $SIR_{target}=SIR_{outage-tgt}+SIR_{BLER-tgt}$, at the start of a transmission (N), using as the initial value of the component $SIR_{BLER-tgt}$ its value in the previous transmission (N−1), while the other component $SIR_{outage-tgt}$ is set at a high initial value, in the example the $90^{th}$ percentile of its values in previous transmissions.

To improve this situation, FIG. 4 presents the results of applying the present invention. The initial convergence process is shown according to the method of the invention, completing the Outage-based OLPC, in which $SIR_{target}$ is calculated as:

$$SIR_{target} = SIR_{outage\text{-}tgt} + SIR_{BLER\text{-}tgt}$$

At the start of a transmission (N), in the initial instant (402) of the convergence process, the method proposed herein sets as the value of the second component ($SIR_{BLER\text{-}tgt}$) that which it had at the final instant (401) of the previous transmission. This is:

$$\lfloor (SIR_{BLER\text{-}target})_N \rfloor_{initial} = \lfloor (SIR_{BLER\text{-}target})_{N-1} \rfloor_{final}$$

As regards the first component ($SIR_{outage\text{-}tgt}$), the method sets at the initial instant (402) of the transmission (N) a high value of said first component ($SIR_{outage\text{-}tgt}$) equal to the 90th percentile of its values in previous transmissions, such as the previous ten. On one hand, this ensures that at the start (402) of the transmission (N) the value of $SIR_{target}$ is sufficiently high to ensure quality, and on the other it prevents a slow initial convergence, as the first component ($SIR_{outage\text{-}tgt}$) has a fast variation, as explained in Spanish patent application ES 2249192.

In this way the end (403) of the initial convergence process is reached much faster. FIGS. 3 and 4 allow comparing the initial convergence times elapsed between points (301) and (302) corresponding to the BLER-based OLPC method with the time elapsed between the points (402) and (403) of FIG. 4, corresponding to the convergence of $SIR_{target}$ established with the method of the invention and adjusted by Outage-based OLPC.

This invention is particularly applicable to the case of discontinuous transmission services, in which the channel is used intermittently, as the initial convergence process takes place very often, compared to services in which the initial convergence takes place only once, when establishing the communication in which a single continuous transmission is performed. For discontinuous transmission services, the process represented in FIG. 4 occurs a great number of times; this is, the transmission ends and is restarted in the same communication or call, whether for voice or data service.

The above design has been used to describe the principles of the invention; notwithstanding this, other alternatives not discussed herein yet incorporating the same approach and purpose are possible. For example, although the invention has been illustrated here using discrete functional blocks executable in the controller (201) of a wireless communications network, the function of any of these blocks can be performed using one or several suitably programmed processors.

In the same way, the invention is also applicable to other standards in addition to WCDMA, as well as to control the power of any signal received by the base station or the terminal units or users or mobile stations.

The terms used in this memory should be understood in a wide and non-limiting sense.

The invention claimed is:

1. Outer loop power control method for wireless communication systems, based on Code Division Multiple Access, which:
   from a data signal (107, 108) received in a communication of a service comprising at least one transmission (N) originating from a base station (102, 103) or a mobile station (104),
   establishes a target signal to interference ratio ($SIR_{target}$) as the sum of two components, a first component ($SIR_{outage\text{-}tgt}$) and a second component ($SIR_{BLER\text{-}tgt}$), characterised in that, at the start of the transmission (N), it sets:
   the initial value of said transmission (N) for the second component ($SIR_{BLER\text{-}tgt}$) equal to the average of the values of said second component ($SIR_{BLER\text{-}tgt}$) during at least one previous transmission (N−1) of the same service.

2. Method according to claim 1, characterised in that it establishes the initial value in the transmission (N) of the first component ($SIR_{outage\text{-}tgt}$) setting it equal to a value clearly higher than the average of the values of said first component ($SIR_{outage\text{-}tgt}$) in at least one prior transmission (N−1) of the same service.

3. Method according to claim 2, characterised in that the initial value in the transmission (N) of the first component ($SIR_{outage\text{-}tgt}$) is set at between the $80^{th}$ and $95^{th}$ percentile of the values of said first component ($SIR_{outage\text{-}tgt}$).

4. Method according to claim 3, characterised in that the initial value in the transmission (N) for the first component ($SIR_{outage\text{-}tgt}$) is set at the 90th percentile of the values of said first component ($SIR_{outage\text{-}tgt}$).

5. Outer loop power control method for wireless communication systems, according claim 1, characterised in that the transmission (N) is carried out in a discontinuous transmission service.

6. Apparatus for outer loop power control in wireless communication systems, characterised in that it comprises at least one programmable electronic device that operates an outer loop power control method for wireless communication systems, based on Code Division Multiple Access, which:
   from a data signal (107, 108) received in a communication of a service comprising at least one transmission (N) originating from a base station (102, 103) or a mobile station (104),
   establishes a target signal to interference ratio ($SIR_{target}$) as the sum of two components, a first component ($SIR_{outage\text{-}tgt}$) and a second component ($SIR_{BLER\text{-}tgt}$), characterised in that, at the start of the transmission (N), it sets:
   the initial value of said transmission (N) for the second component ($SIR_{BLER\text{-}tgt}$) equal to the average of the values of said second component ($SIR_{BLER\text{-}tgt}$) during at least one previous transmission (N−1) of the same service.

7. Apparatus according to claim 6, characterised in that the programmable electronic device is selected from among a general purpose processor, a digital signal processor (DSP), an application-specific integrated circuit (ASCI) and a programmable card (FPGA) or any combination thereof.

8. Apparatus according to claims 6, characterised in that it comprises a radio-frequency receiver (203) able to receive a data signal (107, 108) originating from a base station (102, 103) or a mobile station (104) of the wireless communication system.

9. Apparatus according to claim 6, characterised in that it comprises a radio-frequency transmitter (202) able to send the power control information to a base station (102, 103) or to a mobile station (104) of the wireless communication system.

10. Apparatus according to claim 6 incorporated in a wireless communications network controller.

11. Apparatus according to claim 6 incorporated in a mobile station for wireless communication systems.

12. Radio network controller for wireless communication systems, comprising an outer loop power control apparatus according to claim 6.

13. Mobile station for wireless communication systems, comprising an outer loop power control apparatus, the apparatus comprising at least one programmable electronic device that operates an outer loop power control method for wireless communication systems, based on Code Division Multiple Access, which:

from a data signal (107, 108) received in a communication of a service comprising at least one transmission (N) originating from a base station (102, 103) or a mobile station (104), establishes a target signal to interference ratio ($SIR_{target}$) as the sum of two components, a first component ($SIR_{outage-tgt}$) and a second component ($SIR_{BLER-tgt}$), characterised in that, at the start of the transmission (N), it sets:

the initial value of said transmission (N) for the second component ($SIR_{BLER-tgt}$) equal to the average of the values of said second component ($SIR_{BLER-tgt}$) during at least one previous transmission (N−1) of the same service.

\* \* \* \* \*